Sept. 10, 1940.                G. R. TOWNSEND                2,214,645
                                CONTROL DEVICE
                              Filed May 19, 1939
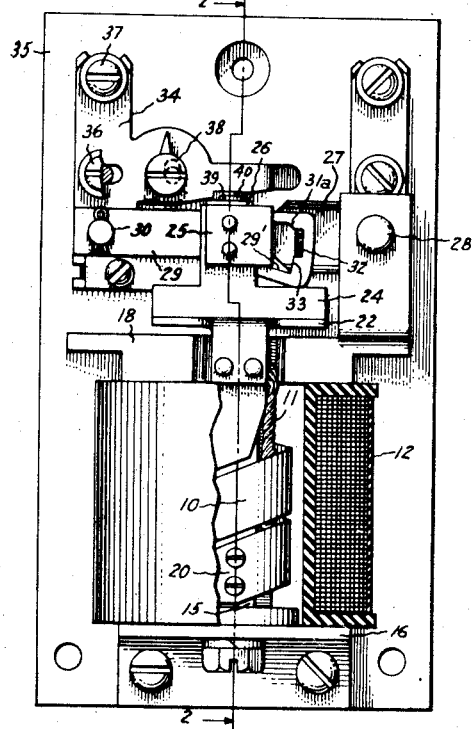
Fig. 1.
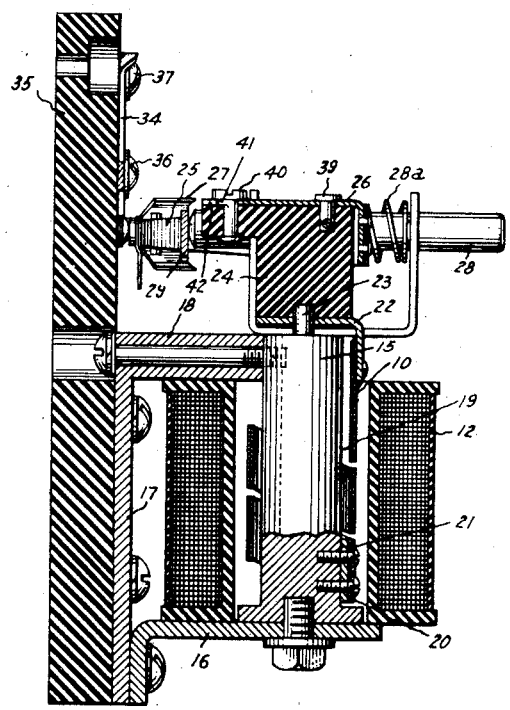
Fig. 2.
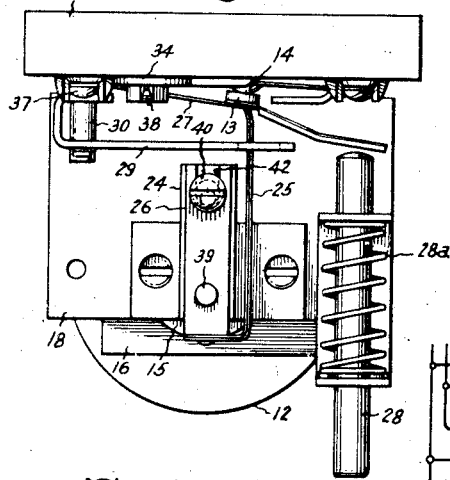
Fig. 3.
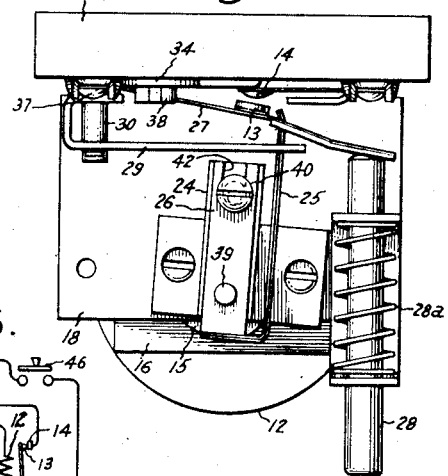
Fig. 4.
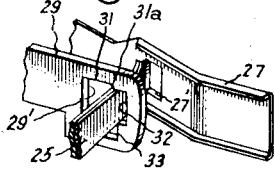
Fig. 5.
Fig. 6.
INVENTOR
George R. Townsend,
BY Harry E. Dunham
ATTORNEY Patented Sept. 10, 1940

2,214,645

UNITED STATES PATENT OFFICE 2,214,645

CONTROL DEVICE

George R. Townsend, Schenectady, N. Y., assignor to General Electric Company, a corporation of New York Application May 19, 1939, Serial No. 274,663

9 Claims. (Cl. 200—122)

My invention relates to control devices, more particularly to shock-proof means for control devices, such as overload protective relays for electric motors, and has for its object simple and reliable means for securing the operating element of the control device against false operation caused by jars or shocks.

In carrying out my invention, I provide means responsive to the speed or rate of movement of the movable element of the control device for securing it. It will be understood that movement caused by jars or shocks is sudden and has a high rate of speed whereas the normal movement of the control device is at a relatively low rate of speed. In one form of my invention I provide a latch arm which normally rests on the movable element and does not restrict the relatively slow movement of the element. The latch arm is provided with an inclined portion which when the movable element is moving at high speed throws the latch arm to another position in which further movement of the movable element is prevented.

For a more complete understanding of my invention, reference should be had to the accompanying drawing in which Fig. 1 is an elevation view of a thermal control device embodying my invention; Fig. 2 is a sectional view taken along the line 2—2 of Fig. 1 looking in the direction of the arrows; Fig. 3 is a plan view of Fig. 1 showing the contacts of the relay in circuit closed position; Fig. 4 is a view similar to Fig. 3 but showing the contacts open after operation of the thermostat; Fig. 5 is an enlarged fragmentary view of the shock-proof device; while Fig. 6 is a wiring diagram showing the device connected to control the motor.

Referring to the drawing, I have shown my invention in one form as applied to a thermally operated motor protective control device such as described and claimed in a copending application of Benjamin W. Jones, Serial No. 276,823, filed June 1, 1939, assigned to the same assignee as this application.

The device comprises a helically wound bimetallic thermostatic strip 10 having its ends electrically connected together through a flexible conductor 11, shown as a stranded conductor, so as to form a short-circuited secondary winding for an inducing coil 12 closely surrounding it. It will be understood that the coil 12 is provided with suitable terminals by means of which the coil is connected in the circuit to be controlled so that it is energized in accordance with the current in the circuit to be controlled. Also the coil 12 may be energized through suitable current transformer means (not shown) to which the coil is connected. In the event of an excessive current, i. e., overload, in the coil 12, the thermostat is heated to such a temperature by the high current induced in it that it flexes sufficiently to release a movable contact 13, cooperating with the stationary contact 14, and thereby opens the controlled circuit which may be the circuit of an electric motor.

The arrangement of the bimetallic thermostat 10 as the short circuited transformer secondary winding of a primary inducing coil 12 provides for the heating of the thermostat to a temperature much higher than the temperature of the adjacent parts. In order that the thermostat may be cooled quickly after operation, it is closely associated with a member or leg 15 made of magnetic material and forming a part of the magnetic core for the coil 12, which leg provides a reservoir for the storage of the heat generated in the thermostat. This leg 15 cooperates with the other legs 16, 17 and 18 to form a magnetic core for the coil 12. As shown, the leg 15 is cylindrical and of nearly the same diameter as the cylindrical helix 10, the leg 15 being sufficiently smaller than the helix to provide a small air space 19 between the two for electrical insulation purposes, and the thermostat 10 being wound flatwise with respect to said leg. This space 19, however, is small enough so that the thermostat is in good thermal relation with the core leg 15 and the heat of the thermostat is transferred rapidly across this space to the leg by radiation and convection.

As shown, the thermostat has its lower end 20 rigidly secured as by screws in good thermal relation to the lower end of the leg 15, a metal spacing member 21 being provided between them. The upper end of the thermostat is secured to the down turned projection of a member 22 which member extends across the upper end of the leg and is pivoted on a pivot pin 23 secured to the leg and extending lengthwise therewith coincident with the longitudinal center line of the leg 15. The member 22 and the parts secured to it are supported by the thermostat and are turned about the pin 23 by movement of the upper end of the thermostat in response to its flexure caused by changes in temperature.

A block of electrically insulating material 24 is secured on the member 22. This block carries a second bimetallic thermostat 25 having one end bent at right angles and secured to the downturned end of a strip 26 which is secured to the top of the block and extends in parallel relation with the block and with the thermostat 25. The thermostat 25 has its main substantially straight portion extending at right angles with the axis of the helix 10. The opposite end of this thermostat 25 is free to move and normally is in abutting relation with a transversely extending flexible arm 27 carrying the movable contact 13. This arm 27 is provided with an aperture 27' into which the end of the thermostat 25 moves to release the arm 27 in response to predetermined temperature. In other words, the helical thermostat, upon an increase in temperature, flexes in a direction to unwind itself so that the support 24 and the thermostat 25 are moved in a clockwise direction, as seen in Fig. 3, about the pivot pin 23.

The bimetallic thermostatic strip 25 is furthermore so arranged as to act as a compensator for changes in atmospheric or ambient temperature. Thus, when the thermostat 10 unwinds upon an increase in ambient temperature, the thermostat 25 substantially offsets this movement by flexing in a direction tending to move its free end toward the left, as seen in Fig. 3, so that the end of the thermostat 25 does not move substantially on the switch arm 27 in response to ambient temperature changes.

When the contact arm 27 is released, as seen in Fig. 4, it may again be moved to the closed circuit position by pressing the button 28 which is biased to the position shown by the spring 28a. Preferably this is done after the short interval of a second or more required for the thermostat 10 to be cooled sufficiently for the free end of the thermostat 25 to hold the switch arm 27 in its closed position.

In accordance with my present invention, I provide shock-proof latching means for the movable arm formed by the thermostat 25. This shock-proof latching means comprises a pivoted latch 29 which is arranged to offer no restriction to the normal relatively slow movement of the arm 25 in response to an overload current in the coil 12 but operates when the arm 25 moves rapidly in response to a jar or shock to secure the arm 25 and prevent it from moving far enough to release the switch arm 27.

The latch member or arm 29 is pivoted on a stationary pivot pin 30, the position of the pin 30 being such that the arm is substantially horizontal, as well as the pin 30, when the device is mounted in its normal upright position as seen in Fig. 1. At its free end the latch 29 is provided with an aperture 29' which is considerably larger than the thermostat arm 25 and through which the end of the arm 25 extends. It will be observed that this aperture 29' is bounded by what are in effect upper and lower extensions of the latch, which extensions embrace the arm 25. The right-hand end of the arm 29. as viewed in Fig. 1, is biased by gravity downward about the pivot 30 so that the upper wall of the aperture 29' normally rests on the arm 25. Under conditions of normal load and with the arm 25 in its normal position securing the switch arm 27, the arm 25 is engaged by some point of the straight portion 31 of the upper wall.

When the thermostat arm 25 is moved by the thermostat 10 in a direction to release the contact arm 27, i. e., in a clockwise direction about the pivot 23, as viewed in Fig. 3, the arm 25 slides along the straight wall 31 until it engages a downwardly inclined portion or projection 31a. This movement of the arm 25 is quite slow, slow enough so that the arm 25 when it engages the inclined wall 31a slowly raises the end of the latch arm 29 as the arm 25 continues its movement. Then the arm 25 moves on without interruption into a recess or notch 32 which is wide enough in a vertical direction, as viewed in Fig. 5, to receive the arm 25 although this recess 32 does not extend to the bottom of the opening 29'. Just before the arm 25 engages the bottom or right-hand wall of the recess 32, its end moves into the aperture 27' releasing the contact arm 27. Thus the latch arm 29 offers substantially no impediment to this slow normal movement of the arm 25.

When the arm 25 moves suddenly at a high rate of speed in a direction to release the switch arm 27 which movement might be caused by a severe jar or shock to the apparatus on which the relay is mounted, the engagement of the arm 25 with the inclined wall 31a throws the arm 29 upward with considerable force. The movement of the latch arm is with sufficient force to bring the lower wall of the aperture 29' into engagement with the arm 25, and the arm 25 then abuts against the lower right-hand edge 33 forming projection means which prevents its entering the notch 32. The arm 25 is thus secured against movement to release the switch arm 27 in response to shocks.

As shown, the pivot pin 30 is mounted on a plate 34 to which also the left-hand end of the contact arm 27 is secured. This plate 34 is secured to the insulating base 35, supporting other parts of the relay, by means of screws 36 and 38. An elongated hole is provided in the plate 34 for the screw 36 so that the plate 34 may be moved toward the right or left hand, as seen in Fig. 1, by turning the cam screw 38 to thereby adjust the position of the arm 27 and contact 13 and the pivot 30 with respect to the thermostat 25. This adjusts the current setting of the device. Electrical connection with the contact arm 27 is made by a terminal screw 37 on the plate 34.

Also, as shown, the supporting strip 26 to which one end of the thermostat 25 is secured, is mounted on the block 24 for adjustment with respect thereto. As shown, the strip 26 is secured to the block on a pin 39 and may be turned about this pin by turning a rivet or bolt 40, the bolt being provided with a cam 41 which cooperates with the sides of a slot 42 in the end of the strip 26. Preferably this is a factory adjustment. For example, the thermostat 10 may be heated to a predetermined temperature as by immersing it in hot water and the thermostat 25 then adjusted by turning the bolt 40 until the end of the thermostat just engages and holds the switch arm 27 in its closed circuit position as shown in Fig. 3. The bolt is then preferably secured permanently as by soldering its head to the strip 26. The purpose of this factory adjustment is to assure that the cam screw 38 will be in an approximately intermediate position when the desired adjustment of the pivot pin 30 is made. The advantage of this is that a substantial range of adjustment of the pivot pin 30 each way from the intermediate position is thereby assured.

As shown in Fig. 6, the contacts 13 and 14 may be included in the circuit of a coil 43 for a contactor 44 in the circuit of the motor 45. A normally open push button 46 is conveniently arranged to close the circuit of the coil 43 to initially close the contactor and start the motor. The push button 46 may then be released, the circuit of the coil 43 being maintained through the normally closed push button 47 and the interlock switch 48 on the contactor. It will be understood that when the contact 13 disengages the contact 14, the circuit of the coil 43 is opened whereupon the contactor drops out and the motor is deenergized. This, of course, deenergizes the primary inducing coil 12 of the relay and the relay and the motor immediately start to cool.

While I have shown a particular embodiment of my invention, it will be understood, of course, that I do not wish to be limited thereto, since many modifications may be made and I, therefore, contemplate by the appended claims to cover any such modifications as fall within the true spirit and scope of my invention.

What I claim as new and desire to secure by Letters Patent of the United States is:

1. The combination in a control device provided with a movable member having a normal slow rate of movement, of shock-proof latching means for said member comprising a movable latch biased to a position providing for normal slow movement of said member, and means responsive to the rate of movement of said member for moving said latch to another position in which the movement of said member is restricted.

2. The combination in a control device provided with a movable arm having a normal slow rate of movement, of shock-proof motion restricting means for said arm comprising a movable member normally cooperating with said arm to provide for normal movement of said arm, means on said member for securing said arm against movement when said member is moved to another position, and means on said member cooperating with said arm upon rapid movement of said arm to move said member to said other position.

3. The combination in a control device provided with a movable arm having a normal slow rate of movement, of shock-proof motion restricting means for said arm comprising a movable member cooperating with said arm and biased to a position providing for normal slow movement of said arm, means on said member for limiting the movement of said arm when said member is moved to another position, and means on said member cooperating with said arm upon rapid movement of said arm to move said member to said other position.

4. The combination in a control device provided with a substantially horizontal arm having a normal slow rate of movement, of shock-proof latching means for said arm comprising a latch pivotally mounted at one end and supported by said pivot and said arm, a projection on said latch engaged by said arm in moving to perform a control operation whereby said latch is lifted, said latch being thrown upward to a limiting position by rapid movement of said arm over said projection, and projecting means on said latch for limiting the movement of said arm when said latch is thrown to said limiting position.

5. The combination in a control device provided with a substantially horizontal arm having a normal slow rate of movement, of shock-proof latching means for said arm comprising a latch pivotally mounted at one end about a substantially horizontal pivot and provided with upper and lower extensions on its other movable end between which said arm extends, said latch being supported by said pivot and said arm in a substantially horizontal position with said upper extension resting on said arm, an inclined portion on said upper extension engaged by said arm in moving to perform a control operation whereby said latch is lifted, said latch being thrown upward by rapid movement of said arm over said inclined portion to bring said lower extension into engagement with said arm, and projection means terminating said lower extension for limiting the movement of said arm when said latch is thrown upward.

6. The combination in a control device provided with a substantially horizontal arm having a normal slow rate of movement, of shock-proof latching means for said arm comprising a latch pivotally mounted at one end about a substantially horizontal pivot and provided with an aperture in its other movable end through which said arm extends, said latch being supported by said pivot and said arm in a substantially horizontal position with the upper wall of said aperture resting on said arm, an inclined portion on said upper wall engaged by said arm in moving to perform a control operation whereby said latch is lifted, said latch being thrown upward by rapid movement of said arm over said inclined portion with the lower wall of said aperture engaging said arm, and projecting means terminating the lower wall of said aperture for limiting the movement of said arm when said latch is thrown upward.

7. A thermal relay comprising a current conducting thermally responsive element in the form of a winding, an energizing winding disposed in inductive relation with said thermally responsive element for inducing a heating current in said element, an arm operated by said thermally responsive element, circuit controlling means operated by said arm when said thermally responsive element is heated to a predetermined temperature, and a latch cooperating with said arm to secure said arm against sudden movement while providing for relatively slow movement of said arm by said thermally responsive element.

8. A thermal relay comprising a magnetic member, a helical bimetallic thermostat surrounding said member, a coil surrounding said thermostat, a conductor connecting together the ends of said thermostat to form a closed secondary winding for said coil, means securing one end of said thermostat, an arm operated by the other end of said thermostat, circuit controlling means operated by said arm upon distortion of said thermostat in response to changes in temperature, and latching means cooperating with said arm to prevent sudden movement of said arm.

9. A control device comprising a bimetallic thermostat in the form of a winding, an energizing winding disposed in inductive relation with said thermostat for inducing a heating current in said thermostat, a substantially horizontal arm operated by said thermostat with a normal slow rate of movement, shock-proof latching means for said arm comprising a latch pivotally mounted at one end and provided with an aperture in its other movable end through which said arm extends, said latch being supported by said pivot and said arm with the upper wall of said aperture resting on said arm, an inclined portion on said upper wall engaged by said arm when said arm is moved by said thermostat whereby said latch is lifted, said latch being thrown upward by rapid movement of said arm over said inclined portion with the lower wall of said aperture engaging said arm, and projecting means terminating the lower wall of said aperture for limiting the movement of said arm when said latch is thrown upward.

GEORGE R. TOWNSEND.